United States Patent [19]

Tamada et al.

[11] Patent Number: 5,150,447
[45] Date of Patent: Sep. 22, 1992

[54] OPTICAL WAVEGUIDE WHICH IS FORMED BY LIQUID PHASE EPITAXIAL GROWTH

[75] Inventors: Hitoshi Tamada; Atsuo Yamada; Yukie Taneyama; Masaki Saitoh, all of Kanagawa, Japan

[73] Assignee: Sony Corporation, Tokyo, Japan

[21] Appl. No.: 747,621

[22] Filed: Aug. 20, 1991

[30] Foreign Application Priority Data

Aug. 24, 1990 [JP] Japan .................. 2-224008

[51] Int. Cl.⁵ .................. G02B 6/12
[52] U.S. Cl. .................. 385/130; 385/14; 156/624
[58] Field of Search .............. 385/129, 130, 131, 132, 385/14; 427/127, 162, 163; 156/621, 624

[56] References Cited

U.S. PATENT DOCUMENTS

| | | | |
|---|---|---|---|
| 3,922,062 | 11/1975 | Uchida | 385/14 |
| 4,679,892 | 7/1987 | Haisma et al. | 385/130 |
| 4,846,541 | 7/1989 | Miura et al. | 385/130 X |
| 5,039,187 | 8/1991 | Ballman et al. | 385/130 |

OTHER PUBLICATIONS

Article Entitled "Fabrication of Periodically Domain-Inverted Channel Waveguide in Lithium Niobate For Second Harmonic Generation" Journal of Lightwave Technology, vol. 7, No. 10 Oct. 1989, pp. 1597 to 1600.
Article "Domain and Dislocation Structure of Lithium Niobate Epitaxial Films" Soviet Solid State 29(9), Sep. 1987 pp. 1578–1580.
Japanese 60083499.
Japanese Publication JP 1232812.
Article entitled "Partial Domain Inversion In LiNbO₃ Plates And Its Application to Piezoelectric Devices", 1986 Ultrasonic Symposium, pp. 719–722.

Primary Examiner—Akm E. Ullah
Assistant Examiner—Phan T. Heartney
Attorney, Agent, or Firm—Hill, Van Santen, Steadman & Simpson

[57] ABSTRACT

An optical waveguide, a dielectric device and method for fabricating such devices in which a substrate is polarized in a first direction and a dielectric thin film is formed on the surface of the substrate and polarized in the opposite direction to the substrate. Parallel grooves may be formed in the substrate. In one embodiment, a first dielectric thin film is formed on the substrate and is formed with grooves and is polarized in the same direction as the substrate. Then, a second dielectric thin film is formed over the first dielectric thin film and it is polarized in a direction which is opposite to the substrate and the first thin film.

7 Claims, 3 Drawing Sheets

OPTICAL WAVEGUIDE WHICH IS FORMED BY LIQUID PHASE EPITAXIAL GROWTH

CROSS-REFERENCES TO RELATED APPLICATIONS

This application is related to application Ser. No. 553,395, filed Jul. 17, 1990, now abandoned, in which the inventors are Masahiro Yamada, Koichiro Kishima, assigned to the assignee of the present invention and application entitled "Optical Device Having Domain Structure And Method For Manufacturing The Same" identified in our files as Case No. P91,1032 in which the inventors are Masahiro Yamada, Koichiro Kishima and Ayumu Taguchi assigned to the assignee of the present invention.

BACKGROUND OF THE INVENTION

1. Field of the Invention

This invention relates in general to optical waveguide suitable for use with optical second harmonic generating devices (hereinafter referred to "optical SHG devices") and to a method for manufacturing such devices.

2. Description of Related Art

Application of a $LiNbO_3$ optical waveguide having a periodic inverted domain structure formed by periodically controlling its domains to optical SHG, for example, by quasi phase matching (abbreviated to "QPM") is described in E. J. Lim et al., Electric Letter. 25 (1989) 731 and J. Webjorn et al., IEEE Photon. Tech. Lett. 1 (1989) 316. Such a periodic inverted domain structure is formed by a method that diffuses Ti into a $LiNbO_3$ substrate or a method that diffuses out $Li_2O$ from a $LiNbO_3$ substrate. Periodic inverted domain structures formed by those methods have a construction as shown in FIG. 4. As shown in FIG. 4, the periodic inverted domain structure has inverted domains 102 having a triangular section with depths of d, arranged with a period of $\Lambda$, and have a direction of spontaneous polarization deviating at an angle of 180° from the direction of spontaneous polarization Ps of a substrate 101 of a z-plate of $LiNbO_3$ single crystal (a plate of single crystal having major surfaces perpendicular to the c-axis of the crystal), and are formed by selectively diffusing Ti into the +c-surface of the substrate 101 or by selectively diffusing out $Li_{2O}$ from the +c-surface of the substrate 101. In this periodic inverted domain structure, d is approximately $\Lambda/4$.

SUMMARY OF THE INVENTION

The present invention relates to high performance optical waveguide constructed by forming a liquid-phase epitaxial process over one major surface of a dielectric crystal substrate which is provided with grooves in one major surface thereof in a predetermined arrangement and polarized in one direction. A dielectric crystal thin film is formed which is polarized in a direction which is opposite to the direction of polarization of the dielectric crystal substrate and which has a Curie temperature which is higher than the temperature for the liquid-phase epitaxial growth process.

The present invention solves the following problem. The depths d of the domains 102 of the conventional $LiNbO_3$ optical waveguide shown in FIG. 4 decreases with a decrease of the period $\Lambda$ which reduces the SHG efficiency. A Ti mask and a $SiO_2$ mask for the diffusion of Ti and the out diffusion of $Li_2O$ cannot completely be removed by etching after the diffusion of Ti and the out diffusion of $Li_2O$ and the Ti mask and the $SiO_2$ mask tend to remain partially on the surface so as to deteriorate the characteristics of the optical waveguide.

A proton exchange annealing method as well as methods using the diffusion of Ti and the out diffusion of $Li_2O$ have been employed for forming optical waveguides. However, the non-linear characteristics of an optical waveguide formed by the proton exchange annealing method is lower than that of $LiNbO_3$ crystal and hence the SHG efficiency of the optical waveguide is low.

It is thus an object of the present invention to provide a high performance optical waveguide such as an optical SHG device capable of functioning with a high SHG efficiency.

It is another object of the present invention to provide a method for fabricating a high performance optical waveguide such as an optical SHG device which is capable of operating at a high SHG efficiency.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

Figure 1A:
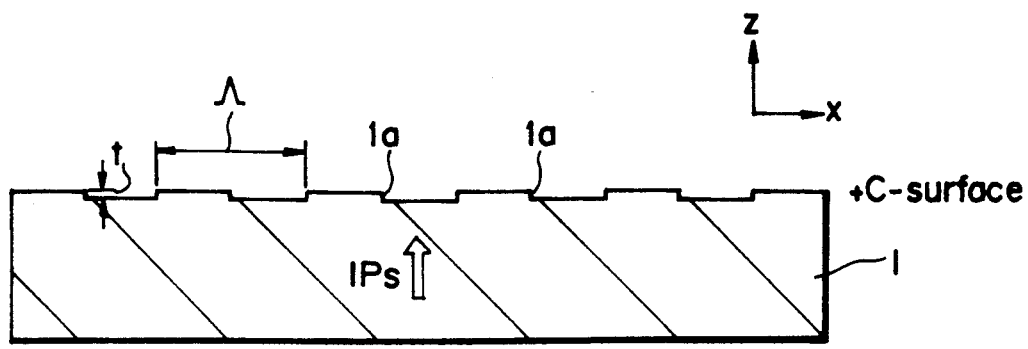
FIGS. 1A and 1B are sectional views of an optical waveguide disclosing a first embodiment of the present invention.

In a first aspect of the present invention, an optical waveguide comprises a dielectric crystal substrate 1 polarized in one direction, and a dielectric crystal thin film 2 formed on one major surface of the dielectric crystal substrate 1 by a liquid-phase epitaxial growth process which is polarized in a direction which is opposite the direction of polarization of the dielectric crystal substrate 1 and which has a Curie temperature which is higher than the temperature for the liquid-phase epitaxial growth process.

In a second aspect of the present invention a method of fabricating an optical waveguide comprises forming by a liquid-phase epitaxial growth process, over one major surface of a dielectric crystal substrate 1, a dielectric crystal thin film 2 which is polarized in a direction which is opposite to the direction of polarization of the dielectric crystal substrate 1 and which has a Curie temperature which is higher than the temperature for the liquid-phase epitaxial growth process.

In a third aspect of the present invention, an optical waveguide comprises a dielectric crystal substrate 1 which is polarized in one direction and is provided with grooves which are in a predetermined arrangement in one major surface thereof, and a dielectric crystal thin film 2 which is formed over the major surface of the dielectric crystal substrate 1 by a liquid-phase epitaxial growth process and which is polarized in a direction which is opposite to the direction of polarization of the dielectric crystal substrate 1 and which has a Curie temperature which is higher than a temperature for the liquid-phase epitaxial growth process.

In a fourth aspect of the present invention, a method of fabricating an optical waveguide comprises forming by a liquid-phase epitaxial growth process, over one major surface which is provided with grooves in a predetermined arrangement of a dielectric crystal substrate 1 which is polarized in one direction, a dielectric crystal thin film 2 which is polarized in a direction which is opposite to the direction of polarization of the dielectric crystal substrate 1 and which has a Curie temperature which is higher than the temperature for the liquid-phase epitaxial growth process.

In a fifth aspect of the present invention, an optical waveguide comprises a dielectric crystal substrate 1 which is polarized in one direction, a first dielectric crystal thin film 2 is formed by a liquid-phase epitaxial growth process over one major surface of the dielectric crystal substrate 1 and is provided in the major surface thereof with grooves in a predetermined arrangement. The film 2 is polarized in the direction of polarization of the dielectric crystal substrate 1 and has a Curie temperature which is higher than the temperature for the liquid-phase epitaxial growth process. A second dielectric crystal thin film 3 is formed by a liquid-phase epitaxial growth process over the major surface of the first dielectric crystal thin film 2, and it is polarized in a direction which is opposite to the direction of polarization of the dielectric crystal substrate 1 and has a Curie temperature higher than the temperature for the liquid-phase epitaxial growth process.

In a sixth aspect of the present invention, a method of fabricating an optical waveguide comprises forming by a liquid-phase epitaxial growth process, over one major surface of a dielectric crystal substrate which is polarized in one direction, a first dielectric crystal thin film 2 which is polarized in a direction which is opposite to the direction of polarization of the dielectric crystal substrate 1 and which has a Curie temperature which is higher than the temperature for the liquid phase epitaxial growth process. Then inverting the polarity of the first dielectric crystal thin film 2, and forming grooves in a predetermined arrangement in the major surface of the first dielectric crystal thin film 2, and then forming a second dielectric crystal thin film which is polarized in a direction which is opposite to the direction of polarization of the dielectric crystal substrate 1 over the major surface of the first dielectric crystal thin film 2 by a liquid-phase epitaxial growth process.

In a seventh aspect of the present invention, a piezoelectric device comprises a dielectric crystal substrate 1 which is polarized in one direction, and a dielectric crystal thin film 2 is formed over one major surface of the dielectric crystal substrate 1 by a liquid-phase epitaxial growth process, and is polarized in a direction which is opposite to the direction of polarization of the dielectric crystal substrate 1 and has a Curie temperature which is higher than the temperature for the liquid-phase epitaxial growth process.

The optical waveguide of the first aspect of the present invention comprises a dielectric crystal substrate 1 which is polarized in one direction, and a dielectric crystal thin film 2 which is formed over one major surface of the dielectric crystal substrate 1 by a liquid-phase epitaxial growth process and is polarized in a direction which is opposite to the direction of polarization of the dielectric crystal substrate 1 and forms a high-performance optical waveguide, such as an optical SHG device capable of operating at a high SHG efficiency.

An optical waveguide fabricated by the method of fabricating an optical waveguide in the second aspect of the present invention which forms, over one major surface of a dielectric crystal substrate 1 which is polarized in one direction, a dielectric crystal thin film 2 which is polarized in a direction which is opposite to the direction of polarization of the dielectric crystal substrate 1 and forms a high-performance optical waveguide, such as an optical SHG device capable of operating at a high SHG efficiency.

The optical waveguide in the third aspect of the present invention comprises a dielectric crystal substrate 1 which is polarized in one direction and is provided with grooves in a predetermined arrangement in one major surface thereof, and a dielectric crystal thin film 2 which is formed over the major surface of the dielectric crystal substrate 1 has a periodic inverted domain structure in which the depth can be determined regardless of th period, and has the same on linear characteristics as the intrinsic nonlinear characteristics of the dielectric crystal. Thus, the optical waveguide of the third aspect of the present invention is a high-performance optical waveguide, such as an optical SHG device capable of operating at a high SHG efficiency.

The method of fabricating an optical waveguide in the fourth aspect of the present invention results in the fabrication of an optical waveguide comprising a dielectric crystal substrate 1 which is polarized in one direction and which is provided in one major surface thereof with grooves in a predetermined arrangement. A dielectric crystal thin film 2 is formed on the major surface of the dielectric crystal substrate 1 and is polarized in a direction which is opposite to the direction of polarization of the dielectric crystal substrate 1. The optical waveguide thus fabricated is a high-performance optical waveguide, such as an optical SHG device capable of operating at a high SHG efficiency.

The optical waveguide in the fifth aspect of the present invention comprises a first dielectric crystal thin film 2 which is polarized in one direction and which is provided in its major surface with grooves, and a second dielectric crystal thin film 3 is formed over the major surface of the first dielectric crystal thin film 2 and is polarized in a direction which is opposite to the direction of polarization of the first dielectric crystal thin film 2. Thus the optical waveguide has a periodic inverted domain structure in which the depth can be determined regardless of the period, and which has the same nonlinear characteristics as the intrinsic nonlinear characteristics of the dielectric crystal and is a high-performance optical waveguide, such as an optical SHG device capable of operating at a high SHG efficiency.

The method of fabricating an optical waveguide in the sixth aspect of the present invention results in the fabrication of an optical waveguide comprising a first dielectric crystal thin film which is polarized in one direction, and a second dielectric crystal thin film 3 which is formed over the first dielectric crystal thin film 2 and which is polarized in a direction which is opposite to the direction of polarization of the first dielectric crystal thin film 2. The optical waveguide thus fabricated has a periodic inverted domain structure in which the depth can be determined regardless of the period. The optical waveguide has the same nonlinear characteristics as the intrinsic nonlinear characteristics of the dielectric crystal, and is a high-performance optical waveguide, such as an optical SHG device capable of operating at a high SHG efficiency.

The piezoelectric device in the seventh aspect of the present invention comprises a dielectric crystal substrate 1 which is polarized in one direction, and a dielectric crystal thin film 2 is formed over one major surface of the dielectric crystal substrate 1 and is polarized in a direction which is opposite to the direction of polarization of the dielectric crystal substrate 1. The differences in the piezoelectric constants between the oppositely polarized dielectric crystal substrate 1 and the dielectric crystal thin film 2 can be utilized to compensate the hysteresis losses of the dielectric crystal substrate 1.

The preferred embodiments of the present invention will be described hereinafter with reference to the accompanying drawings, in which like or corresponding parts are denoted by the same reference characters.

THE FIRST EMBODIMENT

FIG. 1A illustrates, grooves 1a of a depth t, for example, 0.9 μm, arranged at a period Λ, for example, 9.6 μm, formed in the +c-surface of a substrate 1 which comprises a LiNbO$_3$ single crystal z-plate (a single crystal plate having major surfaces perpendicular to the c-axis of the crystal) and which is polarized in a direction which is perpendicular to its major surfaces. The grooves 1a can be formed by forming a resist film having a pattern with openings corresponding to the grooves 1a by a lithographic process, and by etching the surface of the substrate 1 to a depth t by a dry etching process, such as a reactive ion etching (RIE) process.

Then, a LiNbO$_3$ thin film 2 of several micrometers in thickness is formed at a temperature of 905° C. in a fused mixture of 52% by mol Li$_2$O, 8% by mol. Nb$_2$O$_5$ and 40% by mol V$_2$O$_5$ over the +c-surface of the substrate 1 which is provided with the grooves 1a by a liquid-phase epitaxial growth process so that the grooves 1a are completely filled with LiNbO$_3$. The Curie temperature of about 1210° C. is higher than the temperature for the liquid-phase epitaxial growth process by about 300° C.

The direction of spontaneous polarization of the LiNbO$_3$ thin film 2 formed over the +c-surface of the substrate 1 is opposite to the direction of spontaneous polarization of the substrate 1. It is to be noted that the upper surface of the LiNbO$_3$ thin film 2 is perfectly flat despite the fact that the surface of the substrate 1 over which the LiNbO$_3$ thin film 2 is formed is provided with grooves 1a.

Thus, the optical waveguide in the first embodiment has a LiNbO$_3$ thin film formed on the +c-surface of the substrate 1 which is provided with the grooves 1a in a periodic arrangement and is polarized in a direction which is opposite to the direction of polarization of the substrate 1 so as to form a substantially ideal periodic inverted domain structure, and the optical waveguide has the same non-linear characteristics as the intrinsic nonlinear characteristics of the LiNbO$_3$ crystal. Accordingly, the optical waveguide is a high-performance optical waveguide, such as a QPM optical SHG device capable of operating at a high SHG efficiency.

The optical waveguide in the first embodiment is applicable, in addition to the optical SHG device, to optical waveguides utilizing nonlinear optical effect, optical waveguides utilizing acousto-optic effect or electro-optic effect, such as optical switches, modulators and deflectors.

SECOND EMBODIMENT

Figure 1B:
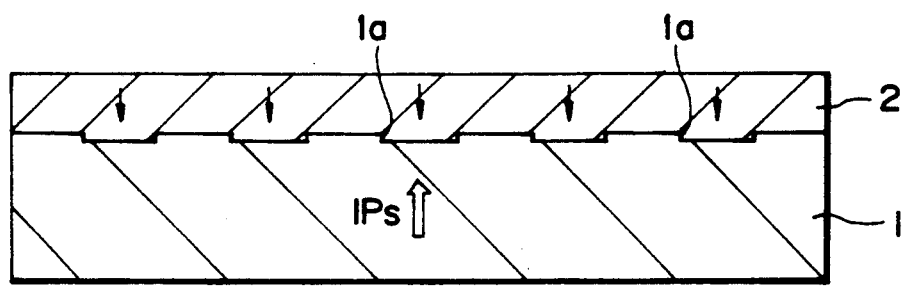
Figure 2:
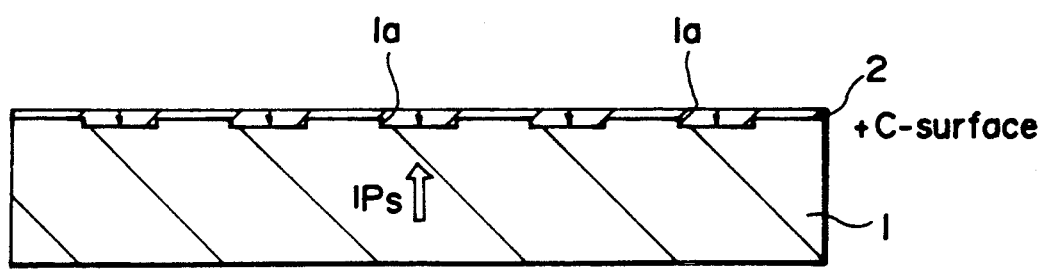
FIG. 2 is a sectional view of an optical waveguide of a second embodiment of the present invention.

FIG. 2 shows an optical waveguide in a second embodiment according to the present invention which employs a substrate 1 which is similar to that employed in the first embodiment. A LiNbO$_3$ thin film 2 is formed over the +c-surface of the substrate 1 by a liquid-phase epitaxial growth process similar to that employed in fabricating the optical waveguide in the first embodiment. The thickness of the LiNbO$_3$ film 2 is approximately equal to the depth of the grooves 1a which are completely filled with LiNbO$_3$ and the upper surface of the LiNbO$_3$ thin film is flat. The polarization of film 2 is opposite to that of the substrate 1. The film 2 in FIG. 2 is much thinner than in FIG. 1B.

The optical waveguide in the second embodiment, like the optical waveguide in the first embodiment, is a high-performance optical waveguide, such as a QPM optical SHG device capable of operating at a high SHG efficiency.

THIRD EMBODIMENT

Figure 3A:
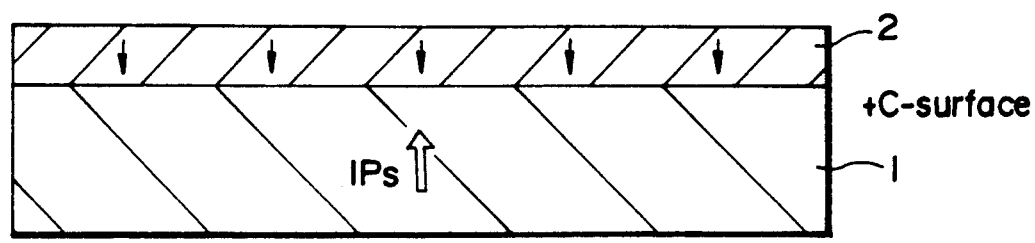
FIGS. 3A–3D are sectional views of an optical waveguide of a third embodiment according to the present invention.

A third embodiment is shown in FIG. 3A wherein a LiNbO$_3$ thin film 2 is formed over the +c-surface of a substrate 1 comprising a LiNbO$_3$ crystal z-plate doped with MgO or the like by a liquid-phase epitaxial growth process similar to that employed in fabricating the optical waveguide in the first embodiment. The LiNbO$_3$ thin film 2 is polarized in a direction which is opposite to the direction of polarization of the substrate 1.

Figure 3B:
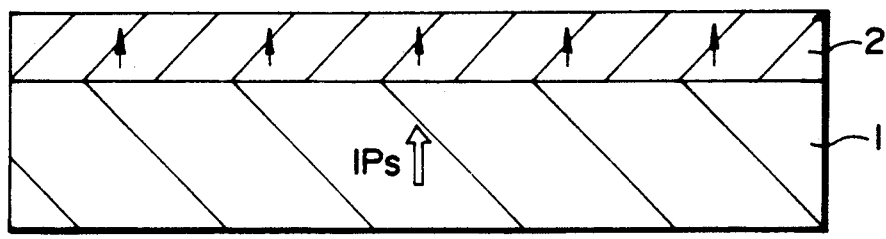

Then, the substrate 1 is heated to a temperature near the Curie temperature and an electric field is applied to the heated substrate 1 to invert the polarity of the LiNbO$_3$ thin film 2 so that the substrate 1 and the LiNbO$_3$ thin film are polarized in the same direction as shown in FIG. 3B.

Figure 3C:
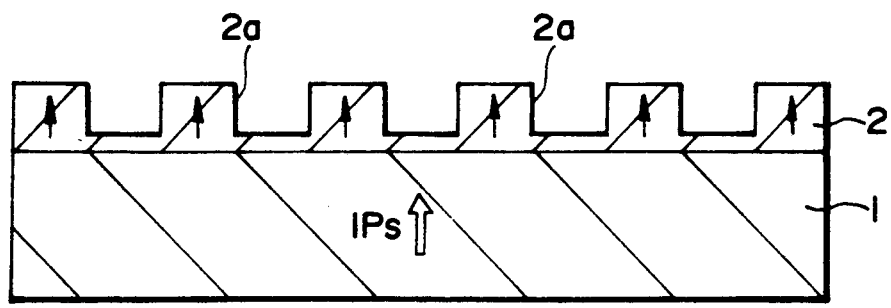

Then, as shown in FIG. 3C, grooves 2a are formed in the major surface of the LiNbO$_3$ thin film in a predetermined arrangement similar to the grooves of the first embodiment.

Figure 3D:
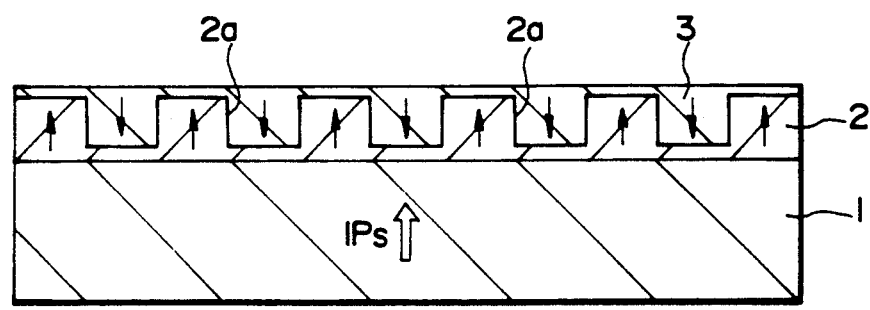
Figure 4:
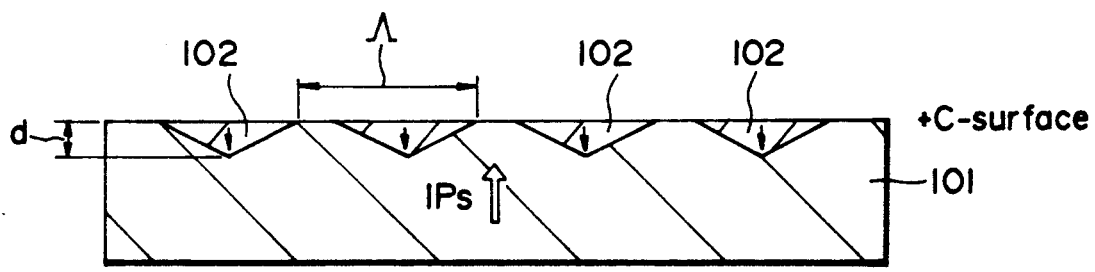
FIG. 4 is a sectional view of the prior art optical waveguide.

Then, as shown in FIG. 3D, a LiNbO$_3$ thin film 3 is formed on the grooved major surface of the LiNbO$_3$ thin film 2 by a liquid-phase epitaxial growth process. The LiNbO$_3$ thin film 3 thus formed by epitaxial growth is polarized in a direction which is opposite to the direction of polarization of the underlying LiNbO$_3$ thin film 2.

The optical device thus fabricated has a substantially ideal periodic inverted domain structure consisting of the LiNbO$_3$, and thin films 2 and 3 and is a high-performance optical waveguide, such as a QPM optical SHG device capable of operating at a high SHG efficiency.

FOURTH EMBODIMENT

FIG. 3A shows an optical device or a piezoelectric device of a fourth embodiment according to the present invention which has a LiNbO$_3$ thin film 2 which is formed by a liquid-phase epitaxial growth process over the +c-surface of a substrate 1 comprising a LiNbO$_3$ single crystal z-plate doped with MgO or the like. The polarity of the LiNbO$_3$ thin film 2 is opposite to that of the substrate 1.

When the optical device is used as a piezoelectric device, the substrate 1 and the LiNbO$_3$ thin film 2 are polarized so as to be opposite to each other. Differences of piezoelectric constants between the substrate 1 and the LiNbO$_3$ thin film 2 can be utilized to compensate for the hysteresis of the substrate 1.

Although the present invention has been described in its preferred embodiments, the present invention is not limited thereto in its application and many modifications thereof are possible on the basis of the technical concepts of the present invention.

For example, the substrate 1 may comprise a LiNbO$_3$ single crystal plate, a Li(NbTa)O$_3$ single crystal z-plate, plates other than the LiNbO$_3$ z-plate and the MgO-doped LiNbO$_3$ single crystal z-plate employed in the foregoing described four embodiments. It is possible to employ dielectric crystal substrates other than the LiNbO$_3$ substrates. Similarly, the LiNbO$_3$ thin films 2 and 3 may be replaced by dielectric crystal thin films other than the LiNbO$_3$ thin films. A substrate having an orientation which is different from those of the substrate 1 employed in the foregoing embodiments may be used.

Furthermore, the present invention is applicable to forming a dielectric crystal thin film locally having inverted domains on a dielectric crystal substrate. A locally inverted domain structure thus formed is applicable to various optical waveguides respectively utilizing electro-optic effect, acousto-optic effect and nonlinear optical effect.

EFFECT OF THE INVENTION

As is apparent from the foregoing description, the optical waveguide and the method of fabricating the same realizes a high-performance optical waveguide, such as an optical SHG device capable of operating at a high SHG efficiency.

The piezoelectric device in accordance with the present invention is capable of compensating the hystersis of the dielectric crystal substrate.

Although the invention has been described with respect to preferred embodiments, it is not to be so limited as changes and modifications can be made which are within the full intended scope of the invention as defined by the appended claims.

We claim as our invention:

1. An optical waveguide comprising:
    a dielectric crystal substrate of LiNbO$_3$ polarized in one direction; and
    a dielectric crystal thin film of LiNbO$_3$ formed over one major surface of said dielectric crystal substrate by a liquid-phase epitaxial growth process and which is polarized in a direction which is opposite to the direction of polarization of the dielectric crystal substrate and having a Curie temperature which is higher than a temperature for the liquid-phase epitaxial growth process.

2. A method of fabricating an optical waveguide, comprising the steps of forming by a liquid-phase epitaxial growth process over one major surface of a dielectric crystal substrate of LiNbO$_3$ a dielectric crystal thin film of LiNbO$_3$ which is polarized in a direction which is opposite to the direction of polarization of the dielectric crystal substrate and which has a Curie temperature which is higher than the temperature used for the epitaxial growth process.

3. An optical waveguide comprising:
    a dielectric crystal substrate which is polarized in one direction and which is provided with parallel grooves in a predetermined arrangement in one major surface thereof; and
    a dielectric crystal thin film formed over said major surface of the dielectric crystal substrate by a liquid-phase epitaxial growth process and polarized in a direction which is opposite to the direction of polarization of the dielectric crystal substrate and which has a Curie temperature which is higher than the temperature used for the epitaxial growth process.

4. A dielectric device according to claim 3 wherein said dielectric film is only slightly thicker than the depth of said grooves.

5. A method of fabricating an optical waveguide, comprising the steps of, forming by a liquid-phase epitaxial growth process over one major surface which is provided with parallel grooves in a predetermined arrangement of a dielectric crystal substrate and which is polarized in one direction, a dielectric crystal thin film which is polarized in a direction which is opposite to the direction of polarization of the dielectric crystal substrate and which has a Curie temperature which is higher than the temperature used for the liquid-phase epitaxial growth process.

6. An optical waveguide comprising:
    a dielectric crystal substrate which is polarized in one direction;
    a first dielectric crystal thin film formed by a liquid-phase epitaxial growth process over one major surface of the dielectric crystal substrate and provided in the major surface thereof with parallel grooves in a predetermined arrangement, and which is polarized in the direction of polarization of the dielectric crystal substrate and has a Curie temperature which is higher than the temperature for the liquid-phase epitaxial growth process; and
    a second dielectric crystal thin film formed by a liquid-phase epitaxial growth process over said major surface of the first dielectric crystal thin film and polarized in a direction which is opposite to the direction of polarization of said dielectric crystal substrate and which has a Curie temperature which is higher than the temperature for the liquid-phase epitaxial growth process.

7. A method of fabricating an optical waveguide comprising the steps of:
    forming by a liquid-phase epitaxial growth process over one major surface of a dielectric crystal substrate which is polarized in one direction, a first dielectric crystal thin film which is polarized in a direction which is opposite to the polarization of the dielectric crystal substrate and which has a Curie temperature which is higher than the temperature for the liquid-phase epitaxial growth process;
    inverting the polarity of the first dielectric crystal thin film;
    forming grooves in a predetermined parallel arrangement in the major surface of the first dielectric crystal thin film; and
    forming a second dielectric crystal thin film which is polarized in a direction which is opposite the direction of polarization of the dielectric crystal substrate over the major surface of the first dielectric crystal thin film by a liquid-phase epitaxial growth process.

* * * * *